(12) United States Patent
Hutchison (10) Patent No.: US 8,616,789 B1
(45) Date of Patent: Dec. 31, 2013

(54) MULTI-ADJUSTABLE CAMERA MOUNT

(76) Inventor: Steve Hutchison, Pegram, TN (US)

( * ) Notice: Subject to any disclaimer, the term of this patent is extended or adjusted under 35 U.S.C. 154(b) by 0 days.

(21) Appl. No.: 13/569,037

(22) Filed: Aug. 7, 2012

(51) Int. Cl.
*G03B 17/00* (2006.01)
(52) U.S. Cl.
USPC ............................................... 396/428
(58) Field of Classification Search
USPC ............................................... 396/428
See application file for complete search history.

(56) References Cited

U.S. PATENT DOCUMENTS

| | | | | |
|---|---|---|---|---|
| 2,599,269 | A * | 6/1952 | Markle | 396/5 |
| 2,971,738 | A * | 2/1961 | Way | 248/226.11 |
| 3,952,982 | A * | 4/1976 | Lewis | 248/124.2 |
| 4,296,725 | A | 10/1981 | Broderick | |
| 4,643,159 | A * | 2/1987 | Ryan | 124/88 |
| 5,497,214 | A * | 3/1996 | Labree | 396/428 |
| 5,520,164 | A | 5/1996 | Huddleston | |
| 6,268,556 | B1 * | 7/2001 | Liao | 84/421 |
| 7,261,272 | B2 * | 8/2007 | Courbon | 248/475.1 |
| 7,780,363 | B1 * | 8/2010 | Holmberg | 396/426 |
| 7,880,793 | B2 | 2/2011 | Holmberg | |
| 8,059,196 | B2 | 11/2011 | Holmberg | |
| 8,076,889 | B2 * | 12/2011 | Lai et al. | 318/575 |
| 8,205,847 | B2 * | 6/2012 | Dorris et al. | 248/317 |
| 8,328,440 | B2 * | 12/2012 | Piltz | 396/428 |
| 2007/0031142 | A1 | 2/2007 | Moody | |
| 2007/0145219 | A1 * | 6/2007 | Lin | 248/274.1 |
| 2010/0236536 | A1 * | 9/2010 | Erickson | 124/88 |
| 2010/0272428 | A1 * | 10/2010 | Piltz | 396/428 |
| 2010/0314519 | A1 * | 12/2010 | Watt et al. | 248/274.1 |

* cited by examiner

*Primary Examiner* — Rodney Fuller
(74) *Attorney, Agent, or Firm* — Miller & Martin PLLC (57) ABSTRACT

A novel adjustable camera mount is provided with both threaded and clamping attachment mechanisms, and joints providing 360° of rotation on either side of an articulated rod.

19 Claims, 10 Drawing Sheets

MULTI-ADJUSTABLE CAMERA MOUNT

FIELD OF THE INVENTION

The invention pertains to an adjustable and variably attached mount, particularly adapted for mounting a camera to a fastener on the mount, and for attachment to a compound bow.

BACKGROUND OF THE INVENTION

As cameras have become smaller and more portable and equipped with transmission capabilities, the practice of sharing photographs and videos has become much more common. Often images are shared in real time environment. Images are now recorded not only in formal settings, but also in the midst of sporting and recreational activities such as hunting and fishing. Two difficulties in taking photographs during recreational activities are the desirability of holding the camera steady so that the resulting images are not blurred, and the need to be able to take photographs and videos while the photographer's hands are occupied with other apparatus aside from the camera.

A particular endeavor of this type is the sport of archery which requires the archer to use one hand to grasp the bow and the second hand to draw the arrow. For a photographer, these constraints make it impractical hold a camera while drawing and releasing arrows. Therefore it is not practical to simultaneously shoot arrows and record photographs manually. In order to facilitate a wide variety of photographic apparatus, numerous attachments have been developed to permit mounting of cameras to bows, and most commonly to compound bows. In addition mounts have been designed for use with other hunting equipment such as firearms and on fishing boats. However, various limitations to these devices make them either awkward to attach, or inadequate to attach a diverse selection of cameras at appropriate positions on a bow. Prior art devices are either time consuming to attach or provide limited flexibility such as only one or two planes of rotation or no articulated joints or brackets to permit the camera to be offset or aligned with the direction of the arrow when mounted at different attachment points.

SUMMARY OF THE INVENTION

The present invention is designed to provide the photographer an easily attached camera mount that allows great versatility in attachment to both the camera and the sports/recreational device, most typically a compound bow. In a preferred embodiment, the camera mount includes a versatile and rotatable mounting connection that includes an optional first joint proving at least about 180° of rotation and an offset from the connection point. The device may also appropriately include a second articulated joint that provides for over 180° of motion. The mount may also include an extension from the articulated joint to a clamping joint that allows for a full 360° of rotation in a clamping plane normal to the axial extension from the articulated joint. the clamping joint may also advantageously include a mounting connection for the camera itself that allows the direction of the camera relative to the clamping joint to rotate through 360° in a mounting plane normal to the clamping plane. The combinations of variability in direction, connection points, and offsets enable the camera to be positioned in virtually any orientation desired by the photographer or archer. In this fashion, photographs can be taken from a desired angle and by attachment to the compound bow in a fashion that least interferes with the balance and action of the bow.

BRIEF DESCRIPTION OF THE DRAWINGS

The present invention will be described by way of exemplary embodiment, but not limitations, illustrated in the accompanying drawings in which like references indicate similar elements and in which:

FIG. 3b is a reverse side angle perspective view of the camera mounted in FIG. 3a;

FIG. 3c is a front perspective view of the camera mounted in 3a;

FIG. 5b is a side plan view of the rotatable mount of FIG. 5a;

FIG. 5c is a top plan view of the rotatable mount of FIG. 5a;

FIG. 7b is a side plan view of the offset bracket of FIG. 7a; and

DETAILED DESCRIPTION OF PREFERRED EMBODIMENTS

Figure 1:
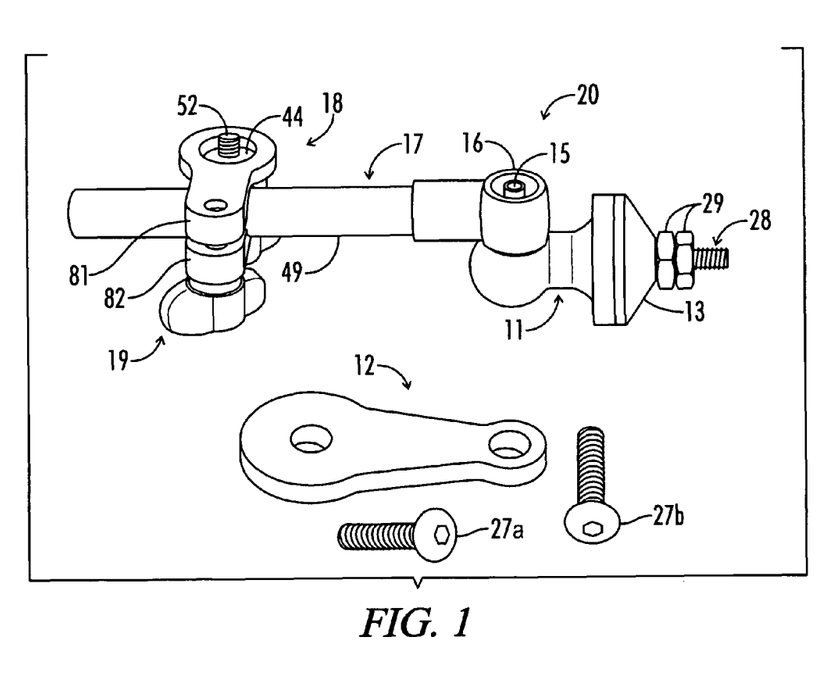
FIG. 1 is a perspective view of an assembled camera mount according to the invention.

Turning first to FIG. 1, an exemplary camera mount assembly 20, configured for attachment in a threaded aperture using threaded shaft 28 is illustrated. The attachment portion of assembly 20 also comprises positioning and tightening bolts 29, and cover member 13. The body of the assembly 20 comprises turret 11 secured to hub 16 with recessed bolt 15, and shaft 49 extending axially from hub 16. The mounting portion of assembly 20 includes clamping member 18 which is positioned about shaft 49 with clamping wing nut 19. Additional pieces utilized for other attachment options include bracket 12, and shorter bolt 27a and longer bolt 27b. It can be seen that turret 11 has a plane of rotation through 360° relative to cover 13, and bolts 29 can be tightened to hold the turret and cover in position. In one embodiment, the interfacing surfaces of turret 11 and cover 13 can be serrated with matching grooves and ridges to provide a secure interlock. In an alternative embodiment, the surfaces can be smooth to allow rotation with the application of force, even when tightened together.

Another range of movement is proved by the articulating joint between the turret 11 and hub 16. In the illustrated embodiment, the shaft 49 extending from hub 16 is able to move through an arc of approximately 300° from its contact with the base of turret 11 in one direction to the other. The size of the base of the turret 11 and thickness of shaft 49 will affect the size of the arc that rod 17 can move through, but in the most preferred constructions, there will be at least 270° degrees of possible motion. Clamping member 18 has a wing nut 51 (shown in FIG. 4) with threaded end 52 extending out to connect with a camera or camera mount as illustrated in FIGS. 3 and 9. The clamping member also has two legs 81,82 separated by gap 80, and defining an opening 70 to receive shaft 49. Wing nut 19 can be operated to tighten legs 81,82 about shaft 49, and this clamping mechanism allows the clamping member to rotate about shaft 49 a full 360° in a plane normal to the axial length of the shaft, referred to as the clamping plane.

Figure 5A:
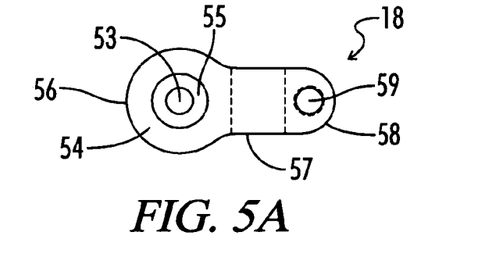
FIG. 5a is a bottom plan view of the rotatable mount.
Figure 5B:
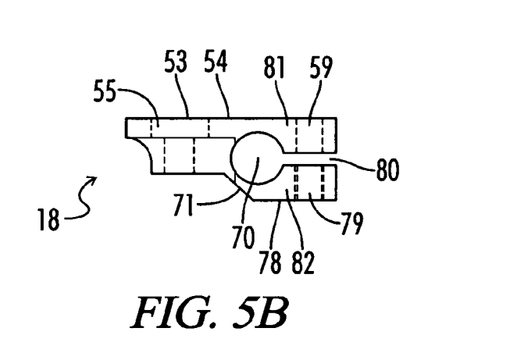

The camera securing fastener 51 is retained in its position with a washer 44 that sits in recess 55 as shown in FIG. 5b. The camera can be attached in any orientation to the clamping member 18, thereby proving a further 360° choice of orientation in a mounting plane normal to the clamping plane. Two additional principal configurations of the illustrated attachment portion of the mount are possible. The first utilizes a bolt 27 in place of threaded post 28 and nuts 29 to clamp the base of turret 11 and cover 13 about an opening through which the threaded portion of bolt 27 is passed. The second alternative utilizes a bolt 27 to clamp one end of bracket 12 between the turret 11 and cover 13, while the opposite end of bracket 12 is secured with another fastener. Again, the surfaces of bracket 12 may be either relatively smooth or serrated, depending upon whether it is desired to allow the application of force to move the orientation of the bracket, or whether it is desired to lock the orientation.

Figure 2:
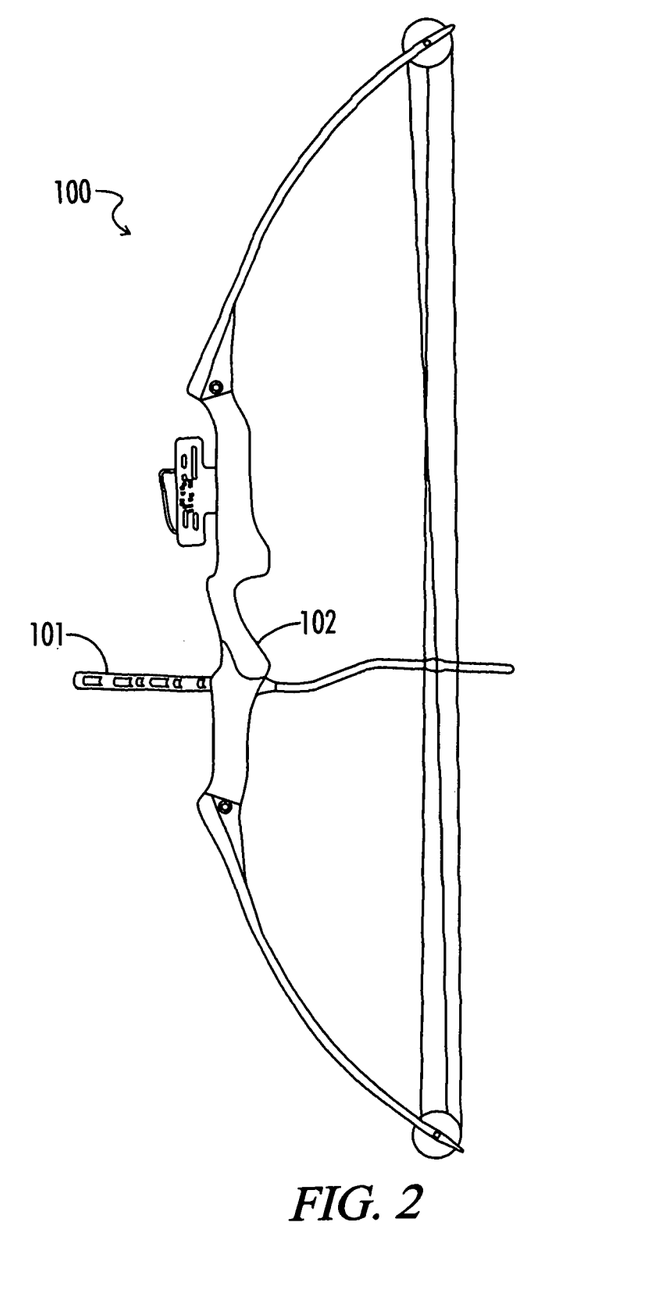
FIG. 2 is an illustration of an exemplary compound bow.

A preferred base for attaching the adjustable mount 20 is a bow, and particularly a compound bow such as illustrated in FIG. 2. The threaded post 28 may be received in bow 100 in the very opening where stabilizer 101 is customarily positioned. Alternatively, bracket 12 can have one end mounted between the stabilizer 101 and bow 100 on the threaded attachment post of the stabilizer 101, with the opposite bracket end between turret 11 and cover 13 to offset the mount 20 laterally from the vertical plane of the bow. In addition, if there are openings or cutouts in the frame of bow 100, the cover 13 and turret 11 can be clamped about those openings with bolt 27 serving as a fastener. These variations are illustrated and described in more detail in connection with FIGS. 3 and 9.

Figure 3A:
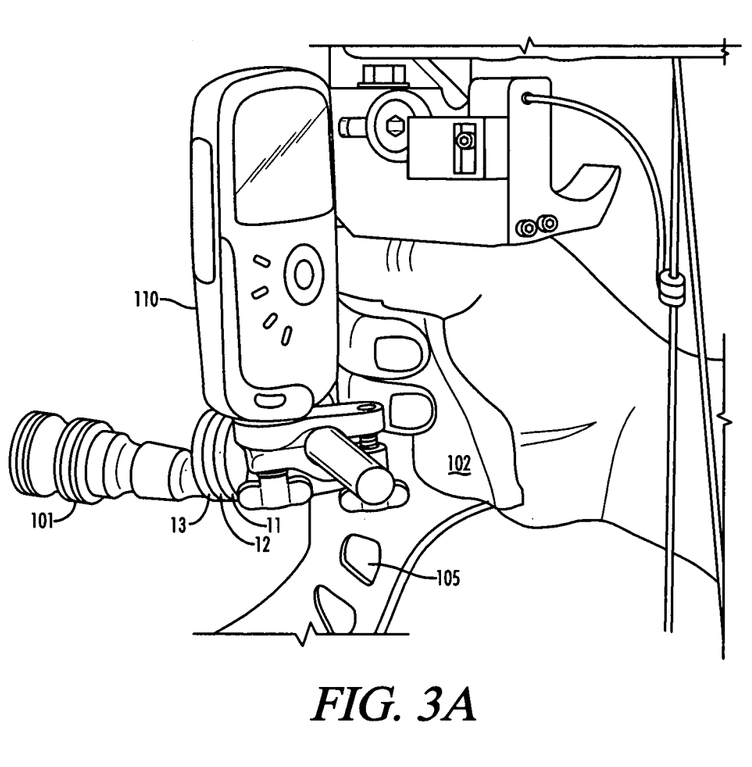
FIG. 3 is a rear perspective view of a camera mounted by offset to a compound bow stabilizer.
Figure 3B:
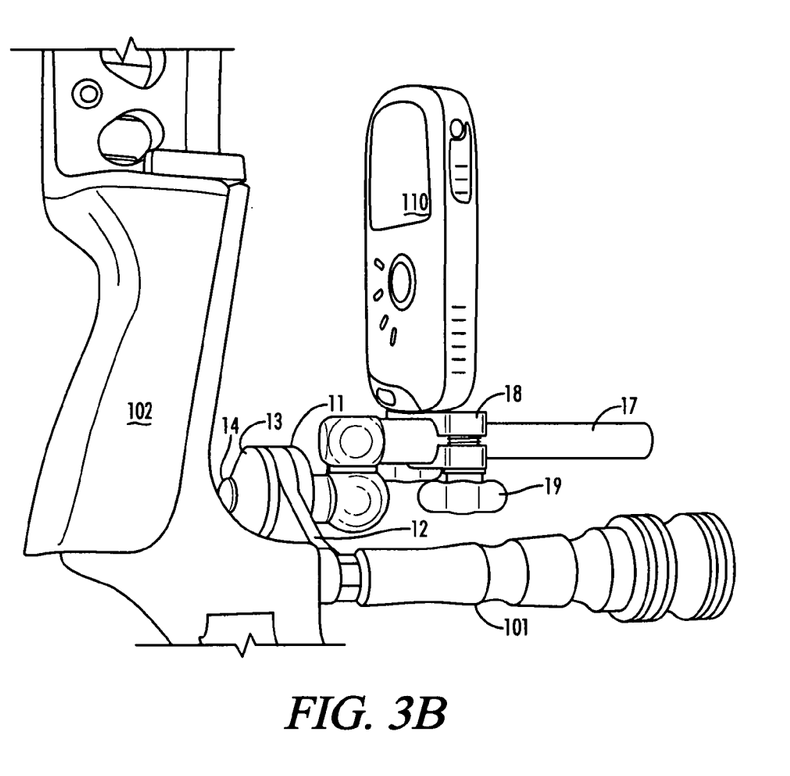
Figure 3C:
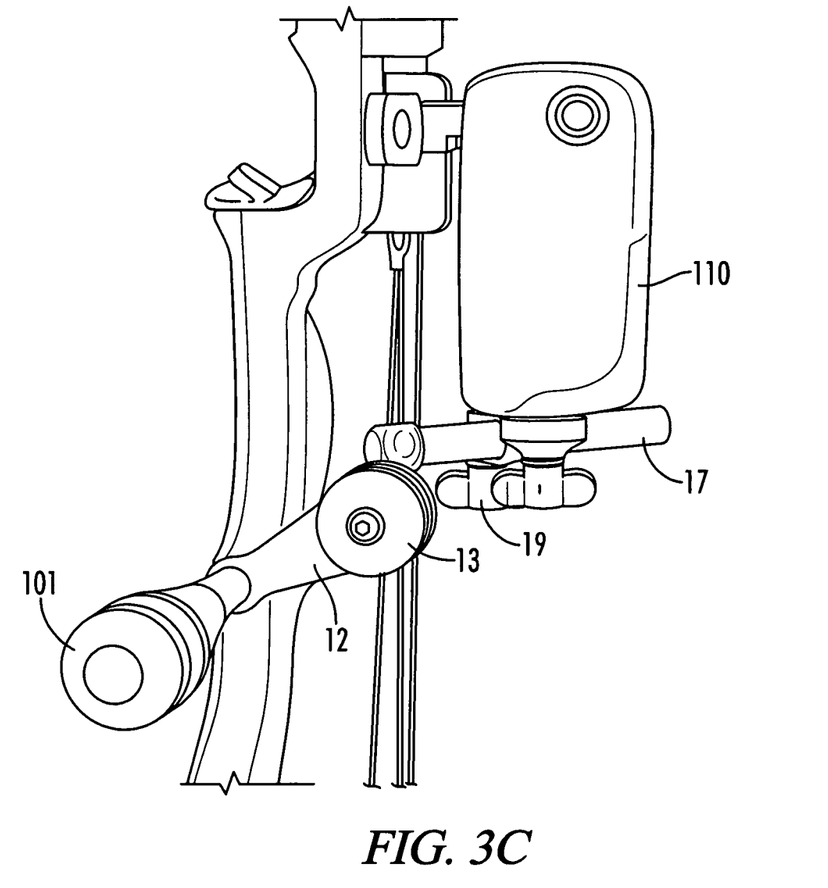

In FIG. 3a, a rear perspective of the grip region of a compound bow is illustrated with stabilizer 101 extending forward from beneath the grip 102. Bracket 12 is used to offset the turret 11 from the attachment point of the stabilizer and camera 110 is attached to the mount. In this FIG. 3a, it is also possible to see openings or cutouts 105 in the frame of the bow. Appropriately sized frame openings provide another mounting option for the adjustable mount. FIG. 3b is a reverse side view of the grip region of the compound bow, showing the smaller end of bracket 12 attached to the bow on the post of stabilizer 101. The bolt head 14 of bolt 27 attaching cover 13 about bracket 12 to turret 11 is illustrated. The clamping member 18 is held in position on rod 17 by wing nut 19, and camera 110 is attached to the clamping member. FIG. 3c is a front view of the same camera 110 and mount assembly.

Figure 4:
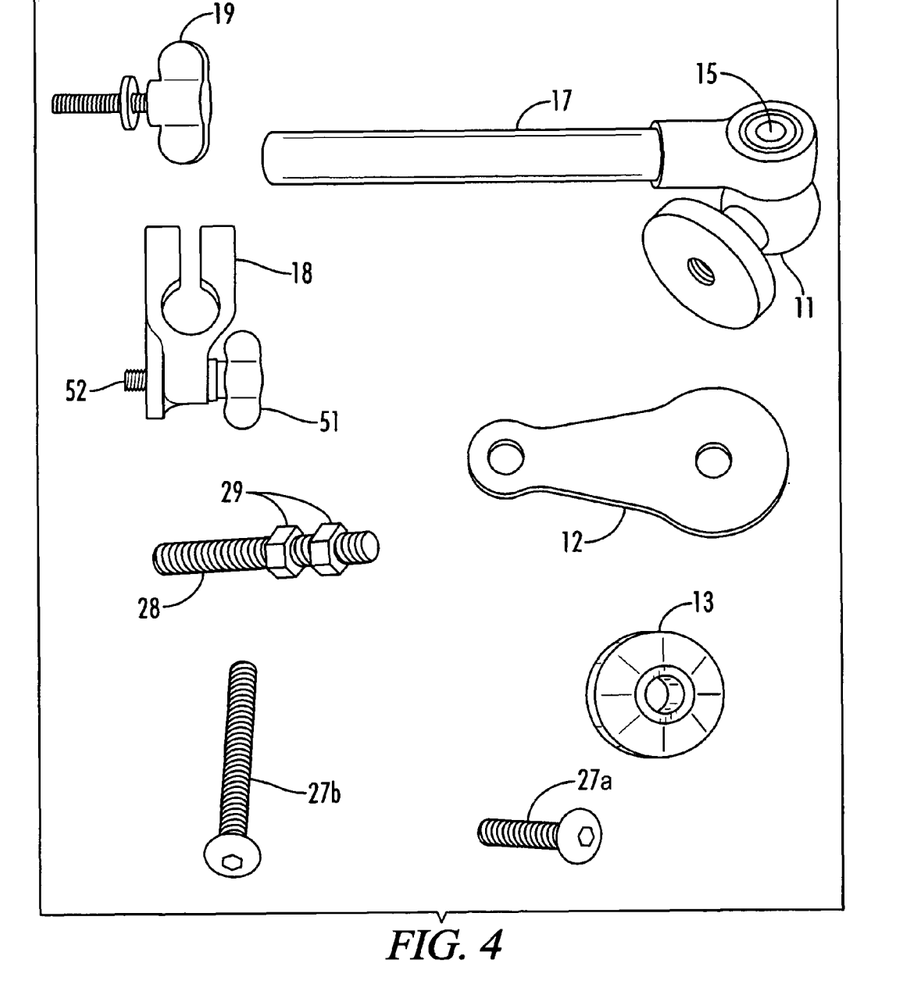
FIG. 4 is an exploded perspective view of the exemplary camera mount of FIG. 1.
Figure 5C:
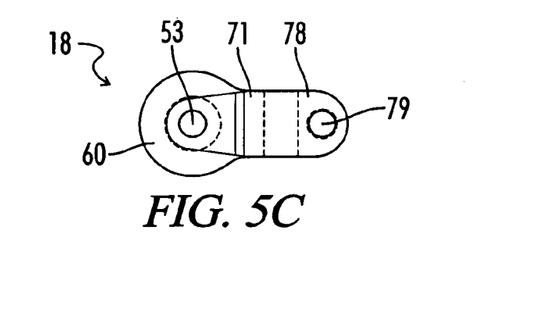

FIG. 4 is an exploded perspective view of the components of an exemplary camera mount, from which it can be seen how the threaded nut 27a can pass through cover 12, and bracket 12 to be received in turret 11, and turret 11, allows rod 17 to move in an articulated fashion. The clamping member is also disassembled with fastener 19 removed, but mounting nut 51 in its operative position. FIGS. 5a-5c show the clamping member 18 in isolation. FIG. 5a illustrates clamping member 18 with first end 56 having a camera mounting surface 54 recess 55 and aperture 53 to receive the camera fastener 51 illustrated in FIG. 4. The first end 56 is connected to second end 58 by neck 57 which in FIG. 5a is the bottom leg 81. Second end 58 has an unthreaded opening 59. It can be seen in FIG. 5b that the bridge 57 is actually comprised of lower leg 81 and upper leg 82 defining between them opening 70 which is adapted to receive shaft 49 of rod 17. The first end 56 is relatively thinner than second end 58 and the additional width is spanned by ramp 71. Ramp 71 is relatively thin so that upon the application of force to legs 81 and 82, ramp 71 will bend and the size of opening 70 can be adjusted. In fact, as can be seen in FIG. 1, fastener 19 has a threaded shaft which extends through unthreaded opening 59 of lower leg 81 into threaded opening 79 of upper leg 82 and by tightening the fastener, the legs 81 and 82 are pulled together and the size of opening 70 is reduced until it clamps firmly about shaft 49. FIG. 5c shows a top plan view of clamping member 18 with upper surface 60 and first end 56 and upper surface 78 of upper leg 82.

Figure 6A:
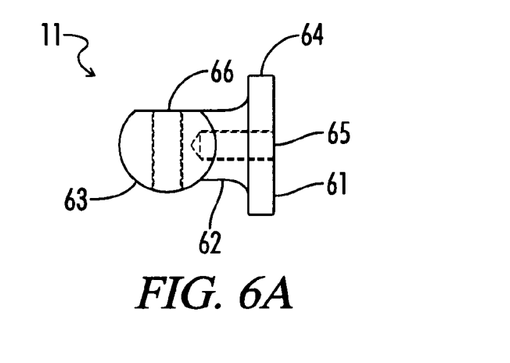
FIG. 6a is a side plan view of the turret member portion of the articulating joint of the camera mount of FIG. 1.
Figure 6B:
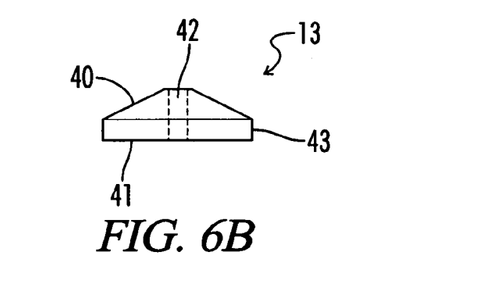
FIG. 6b is a side view of the cover member.

FIG. 6a illustrates the turret member 11 which has a bottom surface 61 of its base 64 through which a vertical threaded opening 65 extends upward through at least a portion of the neck 62. Above the neck is rounded head 63 including a lateral threaded opening 66 which has an axial orientation normal to the axial orientation of vertical threaded opening 65. FIG. 6b illustrates the cover 13 with a bottom surface 41, a top sloped surface 40 and base thickness 43. Unthreaded opening 42 extends between the top and bottom surface and a threaded post 28 or bolt 29 can be passed through opening 42 and used to tighten the cover 13 against the base surface 61 of turret member 11. The bottom surface 41 of cover 13 defines the attachment plane of the mount, and the body of the mount, comprising turret 11 and rod 17 can be rotated through 360° in the attachment plane.

Figure 7A:
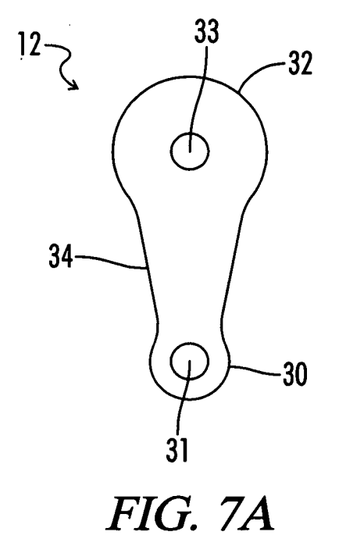
FIG. 7a is a top plan view of the offset bracket of the camera mount of FIG. 1.
Figure 7B:
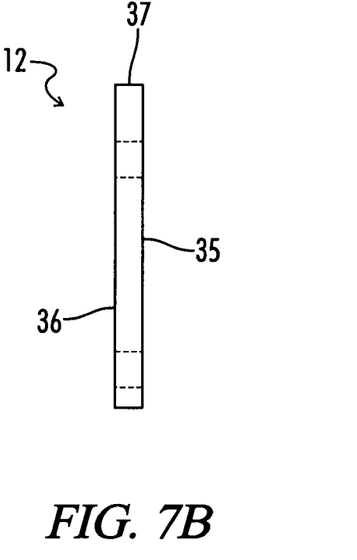
Figure 8:
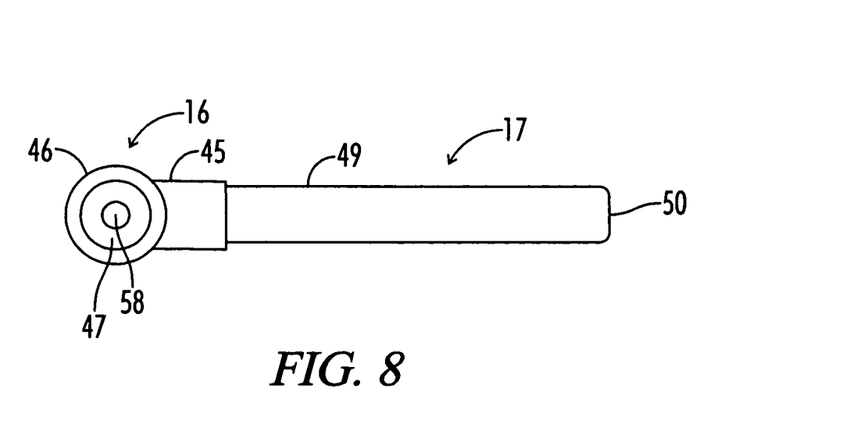
FIG. 8 is a side plan view of the rod of the articulating joint of the camera mount of FIG. 1.

FIGS. 7a, 7b illustrate the bracket member 12 that can be used to provide an offset for the camera mount. Bracket member 12 has first side 36 and second opposed side 35 and thickness 37. A first larger end 32 has an opening 33 therein extending from the first side 36 to second side 35. A neck 34 connects first end 32 to second smaller end 30 which has similar opening 31 extending from first side 36 to second side 35. FIG. 8 illustrates rod 17 with hub portion 16 and shaft 49. At first hub end 16, a cylindrical portion 46 has a recess 47 and unthreaded aperture 48. A threaded fastener such as bolt 15 (shown in FIG. 1 and FIG. 4) can pass through opening 48 into the lateral threaded opening 66 of turret 11. The bolt 15 is tightened to provide the desired amount of resistance when rod 17 is rotated threaded thru an arc of motion of at least 270° to its desired position. Thus, turret 11 and rod 17 form an articulating joint. Cylindrical portion 46 of rod 17 is attached to sleeve 45 which may be integrally formed with shaft 49 or may be manufactured separately to receive the shaft 49 as a separate component. Shaft 49 proceeds to distal end 50 over which the opening 70 of clamping member 18 can be easily received. In the illustrated embodiment, shaft 49 is cylindrical to permit rotation of clamping member 18 about its circumference to a desired position. The clamping member 18 can be positioned at any location along shaft 49 between sleeve 45 and distal end 50 so that the distance of clamping member 18 forms the articulating joint is variable to best position the camera with an appropriate offset from the attachment point.

Figure 9A:
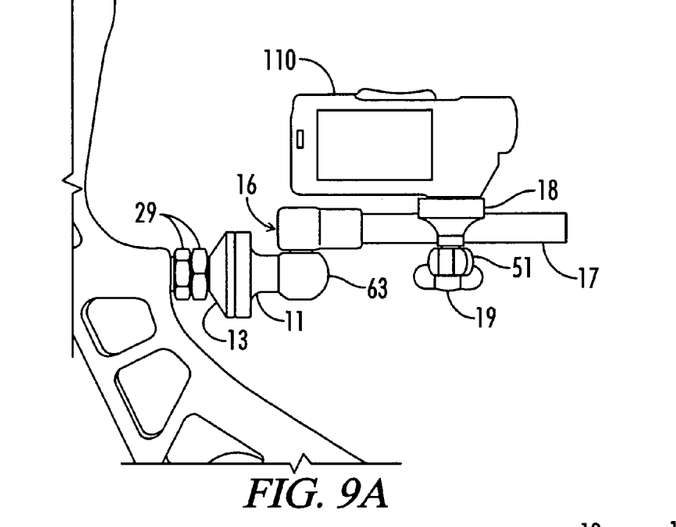
FIG. 9a is a side view of a camera mounted on an exemplary camera mount attached in the position of the stabilizer on a bow.
Figure 9B:
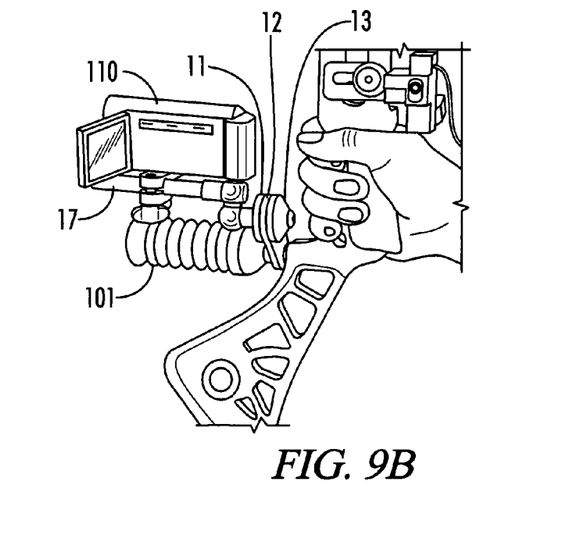
FIG. 9b is a side view of a camera mounted on an exemplary camera mount attached with a bracket to the stabilizer on a bow to offset the camera position.
Figure 9C:
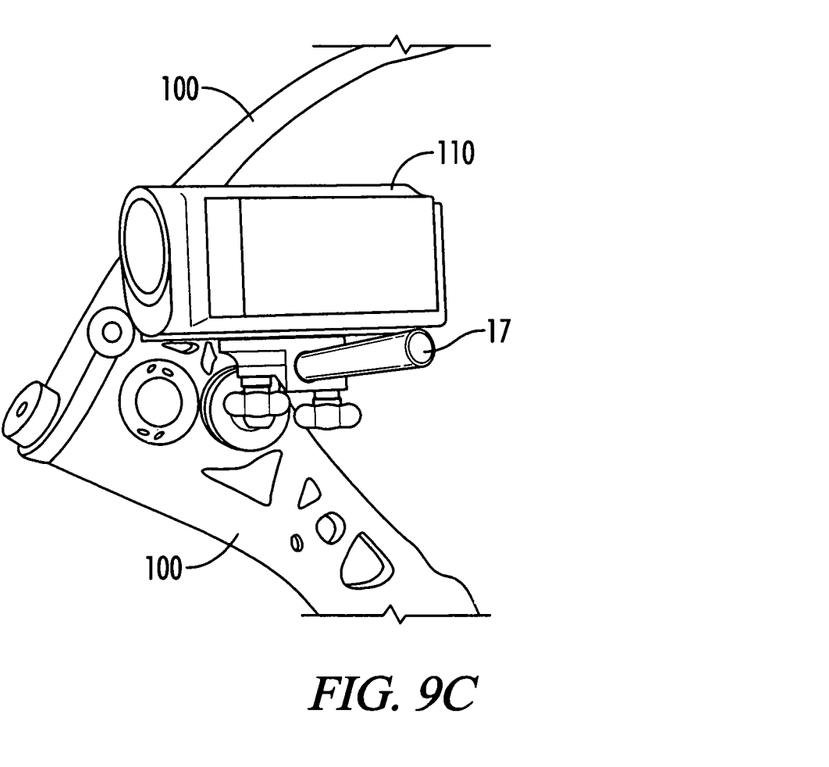
FIG. 9c is a side view of a camera mounted on an exemplary camera mount attached in an opening in the upper riser of a bow.

FIGS. 9a through 9c show three typical mounting configurations for an adjustable camera mount according to the present invention. In FIG. 9a, threaded post 28 has been inserted in the opening of the bow frame that usually receives a stabilizer and nuts 29 adjusted to tighten the mount in place. Cover 13 is securely pressed against the base of turret member 11 with their interfacing surfaces 41,61 defining the attachment plane. The cylindrical portion 16 of rod 17 can move in an articulated fashion with respect to turret 63 through an arc normal to the attachment plane. Clamping member 18 is mounted on rod 17 and tightened in position by use of fastener 19 to clamp legs 81,82 about the shaft 49. Fastener 51 is used to attach the camera 110 to the clamping member. FIG. 9b illustrates the use of bracket 12 to offset the cover 13 and turret member 11 from the attachment point on the stabilizer 101 of the bow. The large end 32 of bracket 12 is shown clamped between cover 13 and turret member 11 to hold the camera mount and rod 17 in place. Camera 110 is again mounted to the clamping member 18 on rod 17. In FIG. 9c, the mount has been attached on the upper riser or limb of bow 100. The turret member 11 is on the visible side of bow 100 and the cover 13 is on the opposite side and the bow frame is clamped between. This positions the camera 110 at location above the arrow. It will be understood that the mount can be attached in other openings in the frame of the bow 100. The camera mount provides a great deal of versatility both with the attachment location and with the orientation of the camera mounted to a clamping member 18. Not only does the mount allow for numerous possible attachment points, but the mount provides an offset both through the elective use of a bracket member and through the operation of the articulating arm or rod 17 and the ability to position the clamping member at any distance along that rod and to orient the camera with 360° of rotation both about the axial orientation of rod 17 and about the direction normal to the axial orientation of rod 17. The ease of attachment and orientation of a camera utilizing a mount according to the invention provides substantial benefit to the sportsman or hunter who is photographing his activities.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

I claim:

1. An adjustable camera mount comprising:
an attachment portion with a cover member having an attachment surface defining an attachment plane;
a body portion having a body surface positioned proximate the attachment surface, a joint, and a shaft extending from the joint to a distal end;
a clamping portion mounted on the shaft and rotatable around the entire circumference of the shaft in a clamping plane normal to the axial direction of the shaft, and having a mounting connection defining a mounting plane normal to the clamping plane;
wherein the attachment portion further comprises a threaded post passing through an opening in the cover member and being received within a threaded opening on the body surface.

2. The adjustable camera mount of claim 1 wherein the shaft extending from the joint is rotatable through an arc of at least 270° in a plane normal to the attachment plane.

3. An adjustable camera mount comprising:
an attachment portion with a cover member having an attachment surface defining an attachment plane;
a body portion having a body surface positioned proximate the attachment surface, a joint, and a shaft extending from the joint to a distal end;
a clamping portion mounted on the shaft and rotatable around the entire circumference of the shaft in a clamping plane normal to the axial direction of the shaft, and having a mounting connection defining a mounting plane normal to the clamping plane;
wherein the attachment portion further comprises a bracket having a first end with a first opening passing therethrough received between the cover member attachments surface and the body surface and a second end with a second opening passing therethrough.

4. An adjustable camera mount comprising:
an attachment portion with a cover member having an attachment surface defining an attachment plane;
a body portion having a body surface positioned proximate the attachment surface, a joint, and a shaft extending from the joint to a distal end;
a clamping portion mounted on the shaft and rotatable around the entire circumference of the shaft in a clamping plane normal to the axial direction of the shaft, and having a mounting connection defining a mounting plane normal to the clamping plane;
wherein the body surface is a base of a turret and has a threaded vertical opening therein.

5. The adjustable camera mount of claim 4 wherein the turret has a neck extending up from base to a head, the head having a lateral threaded opening therein.

6. The adjustable camera mount of claim 5 wherein the joint is an articulated joint formed by connecting an opening in a hub end of a rod to the lateral threaded opening in the head of the turret.

7. The adjustable camera mount of claim 6 wherein the rod further comprises the shaft extending from the hub to a distal end.

8. An adjustable camera mount comprising:
an attachment portion with a cover member having an attachment surface defining an attachment plane;
a body portion having a body surface positioned proximate the attachment surface, a joint, and a shaft extending from the joint to a distal end;
a clamping portion mounted on the shaft and rotatable around the entire circumference of the shaft in a clamping plane normal to the axial direction of the shaft, and having a mounting connection defining a mounting plane normal to the clamping plane;
wherein the clamping portion has an opening between two legs to receive the shaft and a fastener connecting the two legs that is tightened to fix the position of the clamping portion on the shaft.

9. The adjustable camera mount of claim 8 wherein the mounting connection is a threaded fastener.

10. In combination, a compound archery bow and a camera attached to said archery bow by an adjustable camera mount comprising a cover member having an attachment surface defining an attachment plane and an opening therein passing through the cover member, a threaded fastener passing through the opening in the cover member;
a first end of said threaded fastener being received within a threaded opening of a body portion of the adjustable camera mount, said body portion further comprising an articulated joint and a shaft extending from the joint to a distal end;

a clamping portion mounted on the shaft and rotatable around the entire circumference of the shaft in a clamping plane normal to the axial direction of the shaft, and having a mounting surface defining a mounting plane normal to the clamping plane.

11. The combination of claim 10 further comprising a bracket having a first end with a first opening passing therethrough received on the threaded fastener between the cover member attachment surface and the body portion and a second end with a second opening passing therethrough and a second threaded fastener passing through the second opening and into an opening of the archery bow.

12. The combination of claim 10 wherein the body portion with a threaded opening is a base of a turret.

13. The combination of claim 12 wherein the turret has a neck extending up from the base to a head, the head having a lateral threaded opening therein, normal to the opening in the base.

14. The combination of claim 13 wherein the joint is an articulated joint formed by connecting an opening in a cylindrical end of a rod comprising the shaft, to the head of the turret.

15. The combination of claim 10 wherein a second end of the threaded fastener is received in an opening of the archery bow.

16. The combination of claim 10 wherein the clamping portion has an opening between two legs to receive the shaft and a fastener connecting the two legs that is tightened to fix the position of the clamping portion in the clamping plane about the shaft.

17. The combination of claim 10 wherein the shaft extending from the joint is rotatable through an arc of at least 270° in a plane normal to the attachment plane.

18. An adjustable camera mount comprising a threaded fastener, a cover member having an attachment surface defining an attachment plane and an unthreaded opening passing through the attachment surface and the cover member, a turret member having a bottom surface positioned proximate and parallel to the attachment surface and fully rotatable with respect thereto, said bottom surface having a threaded opening therein, said turret member having a neck and head with a threaded opening therein, a bolt passing through an opening in a hub end of a rod to form an articulating joint with the head of the turret member and a shaft extending outward from the hub end to a distal end, a clamping member with an opening formed between two legs being positioned with the opening on the shaft and having a clamping fastener to tighten the legs about the shaft, and having a mounting surface defining a mounting plane and a mounting fastener to connect with a camera.

19. The adjustable camera mount of claim 18 further comprising a bracket member having a first end received on the threaded fastener passing through the opening in the cover member and having a second end with an opening receiving a second fastener.

* * * * *